US006240413B1

(12) United States Patent
Learmont

(10) Patent No.: US 6,240,413 B1
(45) Date of Patent: May 29, 2001

(54) FINE-GRAINED CONSISTENCY MECHANISM FOR OPTIMISTIC CONCURRENCY CONTROL USING LOCK GROUPS

(75) Inventor: Timothy R. Learmont, Palo Alto, CA (US)

(73) Assignees: Sun Microsystems, Inc., Palo Alto, CA (US); BAAN Development, B.V., Barneveld (NL)

( * ) Notice: Subject to any disclaimer, the term of this patent is extended or adjusted under 35 U.S.C. 154(b) by 0 days.

(21) Appl. No.: 09/106,119

(22) Filed: Jun. 29, 1998

Related U.S. Application Data

(60) Provisional application No. 60/068,415, filed on Dec. 22, 1997.

(51) Int. Cl.[7] .................................................... G06F 17/30
(52) U.S. Cl. ............................. 707/8; 707/202; 707/103; 707/10
(58) Field of Search ............................... 707/8, 103, 202, 707/10

(56) References Cited

U.S. PATENT DOCUMENTS

| | | | |
|---|---|---|---|
| 4,589,092 | * 5/1986 | Matick | 364/900 |
| 5,043,876 | * 8/1991 | Terry | 707/202 |
| 5,261,069 | * 11/1993 | Wilkinson et al. | 707/8 |
| 5,263,155 | * 11/1993 | Wang | 707/8 |
| 5,280,612 | * 1/1994 | Lorie et al. | 707/8 |
| 5,291,583 | 3/1994 | Bapat . | |
| 5,301,297 | * 4/1994 | Menon et al. | 395/425 |
| 5,499,371 | 3/1996 | Henninger et al. . | |
| 5,574,882 | * 11/1996 | Menon et al. | 395/441 |
| 5,596,746 | 1/1997 | Shen et al. . | |
| 5,615,362 | 3/1997 | Jensen et al. . | |
| 5,706,506 | 1/1998 | Jensen et al. . | |
| 5,717,924 | 2/1998 | Kawai | 395/613 |
| 5,742,813 | * 4/1998 | Kavanagh et al. | 707/8 |
| 5,774,731 | * 6/1998 | Higuchi et al. | 395/726 |
| 5,812,134 | 9/1998 | Pooser et al. . | |
| 5,835,910 | * 11/1998 | Kavanagh et al. | 707/103 |
| 5,857,197 | 1/1999 | Mullins | 707/103 |
| 5,937,409 | 8/1999 | Wetherbee | 707/103 |
| 5,983,020 | 11/1999 | Sweeney et al. | 395/705 |

FOREIGN PATENT DOCUMENTS

| | | |
|---|---|---|
| 0 472 812 A1 | 3/1992 | (EP) . |
| WO 95/03586 | 2/1995 | (WO) . |
| WO 95/04960 | 2/1995 | (WO) . |
| WO 97/03406 | 1/1997 | (WO) . |

OTHER PUBLICATIONS

SQL Tutorial: Introduction to Structured Query Language, Version 3.63 (May 1998), URL http://w3.one.net/~jhoffman/sqltut.htm#Compound Conditions.

The JDBC Database Access API (Apr. 1998), URL http://java.sun.com/products/jdbc.

(List continued on next page.)

Primary Examiner—Thomas Black
Assistant Examiner—Frantz Coby
(74) Attorney, Agent, or Firm—Finnegan, Henderson, Farabow, Garrett and Dunner, L.L.P.

(57) ABSTRACT

A method and system for database concurrency control is provided that allows lock groups to contain columns of different tables and allows an individual column of a table to be in more than one lock group. While using optimistic concurrency control for monitoring multiple transactions modifying the same database, it allows the concurrent access of a single table when the individual columns of the table are accessed by separate users or applications. This, in turn, reduces the delay of waiting for a table to be free for access and decreases the delay of rolling back transactions that are concurrently accessing a table. The reduction of these delays increases the overall data processing efficiency for the system.

18 Claims, 3 Drawing Sheets

OTHER PUBLICATIONS

O'Brien, Stephen K., "Turbo Pascal 5.5: The Complete Reference", Osborne/McGraw–Hill (1989), pp. 500–522.

Gosling, Joy, and Steele, "The Java™ Language Specification", Addison–Wesley (1996).

Hamilton, Cattell, and Fisher, "JDBC Database Access with Java™", Addison–Wesley (1997).

R.G.G. Cattell et al., "Object Database Standard: ODMG 2.0", Morgan Kaufmann Publishers, Inc. (1997).

Campione, Mary and Kathy Walrath, "The Java™ Tutorial", Addison–Wesley (1996).

Arnold and Gosling, "The Java™ Programming Language", Addison–Wesley (1996).

Agrawal, D. et al., "Distributed Multi–version Optimistic Concurrency Control for Relational Database," Mar. 1986, pp. 416–421.

Ahad, R. and T. Cheng, "HP OpenODB: An Object–Oriented Database Management System for Commercial Applications," Hewlett–Packard Journal vol. 44, No. 3, Jun. 1993, pp. 20–30.

Alashqur, Abdallah et al.: "O–R Gateway: A system for Connecting C++ Application Programs and Relational Databases," USENIX C++ Technical Conference Proceedings, 10–13 Aug. 1992, Portland, OR, U.S., pp. 151–169, XP000534151.

"Customizable Four Pane Layout for Database Table Definition," IBM Technical Disclosure Bulletin, vol. 35, No. 7, Dec. 1992, pp. 268–269.

"Automatically Revising Function Prototypes in C and C++ Implementations of System Object Model Classes," IBM Technical Disclosure Bulletin, vol. 37, No. 08, Aug. 1994, pp. 363–365.

"The Enterprise Objects Framework," Enterprise Objects Framework: Building Reusable Business Objects, Jul. 1994, pp. 1–13.

"FAST and Secure Stored Procedures for a Client/Server DBMS," IBM Technical Disclosure Bulletin, vol. 38, No. 01, Jan. 1995, pp. 79–82, XP000498695, New York, U.S.

Gantimahapatruni, S. et al., "Enforcing Data Dependencies in Cooperative Information Systems," IEEE, May 12, 1993, pp. 332–341.

Heiler, S. et al.: "Object Views: Extending the Vision," Proceedings of the International Conference on Data Engineering, Los Angeles, Feb. 5–9, 1990, No. Conf. 6, Feb. 05, 1990, pp. 86–93, XP000279935.

Kleissner, C., "Enterprise Objects Framework, A Second Generation Object–Relational Enabler," Jun. 1995, pp. 455–9.

Lindholm, T. and F. Yellin, "The Java Virtual Machine Specification," Second Edition, Apr. 1999, pp. 1–473.

Qian, X. et al., "Query Interoperation Among Object–Oriented and Relational Databases," IEEE, Mar. 6, 1995, pp. 271–8.

"Sun Simplifies Database Programming with Java Blend," Press Release, Sun Microsystems, Mountain View, CA, U.S., Aug. 21, 1997, pp. 1–3.

ToPlink, "The Industry Standard for Persistence Product, A White Paper: The Object People," Canada, 1997.

Wang, S., "Improvement of Concurrency Control Within Object–Oriented Database Systems," IEEE, Apr. 5, 1990, pp. 68–70.

Hans Bank, "Evaluation Process," Memo: OQL, Evaluation Process, Sep. 15, 1997 (Rev. 0.11), pp. 1–7.

"Applications in Java and Extended Java," Sep. 28, 1998, pp. 1–21.

* cited by examiner

FINE-GRAINED CONSISTENCY MECHANISM FOR OPTIMISTIC CONCURRENCY CONTROL USING LOCK GROUPS

RELATED APPLICATIONS

The following identified U.S. patent applications are relied upon and are incorporated in their entirety by reference in this application.

Provisional U.S. Patent Application Ser. No. 60/068,415, entitled System and Method for Mapping Between Objects and Databases," filed on Dec. 22, 1997.

U.S. patent application Ser. No. 09/106,186, "Object Relational Mapping Tool That Processes Views," and filed on the same date herewith.

U.S. patent application Ser. No. 09/106,189, entitled "Evolution of Object-Relational Mapping Through Source Code Merging" and filed on the same date herewith.

U.S. patent application Ser. No. 09/105,957, entitled "Integrating Both Modifications To Source Code and Modifications To A Database Into Source Code By An Object-Relational Mapping Tool," and filed on the same date herewith.

U.S. patent application Ser. No. 09/106,210, entitled "Rule-Based Approach to Object-Relational Mapping Strategies," and filed on the same date herewith.

U.S. patent application Ser. No. 09/106,212, entitled "User Interface for the Specification of Lock Groups," and filed on the same date herewith.

U.S. patent application Ser. No. 09/106,211, entitled "User Interface for the Specification of Index Groups Over Classes," and filed on the same date herewith.

U.S. patent application Ser. No. 09/106,188, entitled "Method and Apparatus for Creating Indexes in a Relational Database Corresponding to Classes in an Object-Oriented Application," and filed on the same date herewith.

U.S. patent application Ser. No. 09/106,190, entitled "Method and Apparatus for Loading Stored Procedures in a Database Corresponding to Object-Oriented Data Dependencies," and filed on the same date herewith.

U.S. patent application Ser. No. 09/106,046, entitled "An Integrated Graphical User Interface Method and Apparatus for Mapping between Objects and Databases," and filed on the same date herewith.

U.S. patent application Ser. No. 09/105,955, entitled "Methods and Apparatus for Efficiently Splitting Query Execution Across Client and Server in an Object-Relational Mapping," and filed on the same date herewith.

FIELD OF THE INVENTION

The present invention generally relates to data processing systems and, more particularly, to a method and system for using lock groups to implement fine-grained consistency for optimistic concurrency control.

BACKGROUND OF THE INVENTION

Computer systems often use databases to store and manage large amounts of data. These databases usually have multiple clients that use and manipulate this data. Clients typically manipulate data in the form of various "read" and "write" operations that either allow the client to retrieve data from the database or allow the client to modify data in the database. A typical client transaction may have several read and write operations, and in a database, it is common for many transactions to concurrently execute to improve processing efficiency. In such a case, if access to the database by each transaction is allowed freely, the consistency among the data can be jeopardized.

It is common for many database clients, or multiple procedures on a single client machine, to seek concurrent access to a database system in order to read data from the database and write data to the database. However, each client needs to interact with the database free from the interference of others. That is, during the course of a client's transaction to the database—reading and modifying a set of data from the database—that portion of the database must remain unchanged by other clients. To prevent this problem, concurrency control is used by database systems to govern concurrent access to the database system. It ensures the integrity of each transaction in a multi-user environment.

One type of concurrency control is "optimistic concurrency control." Optimistic concurrency control means that the check point for collisions between transactions is at the end of a transaction. With optimistic concurrency control, it is assumed that a transaction will finish before another transaction attempts to change the same data. The transaction reads the necessary data, internally makes its data updates, and finally determines if any of the data has changed before writing the updates to the database. When the client is ready to actually commit its data modifications to the database, the system checks if that data has been modified by any other transaction since the time the client's transaction first read the data. If there has been no change to the particular data, then the client's transaction can complete. If any data has been changed, then the system rolls back the client's updates and notifies the client so that it can retry its transaction, if desired. A "roll back" refers to the transaction being canceled and all data being restored to its original state before the transaction started. While optimistic concurrency control can provide significant performance improvement by avoiding the delay of initially securing the data, it is also possible that the system must roll back a transaction if another process modifies the same data.

Referring now to object-oriented systems and programming languages, such systems use "classes" containing both data members that store data and function members (or methods) that act upon the data. Classes form templates for the creation of "objects," representing instances of a class. Classes also define methods, which are procedures that operate on objects of the same class. An exemplary object-oriented programming language is the Java™ programming language described in "The Java Programming Language," Ken Arnold, James Gosling, Addison-Wesley, 1996, which is incorporated herein by reference. For further description of the Java language, refer to "The Java Language Specification," James Gosling, Bill Joy, Guy Steele, Addison-Wesley, 1996, which is incorporated herein by reference.

When accessing databases in object-oriented systems, some systems use "lock groups" to implement optimistic concurrency control. With reference to optimistic concurrency control, a lock group, despite its name, does not refer to locking blocks of data. Instead, a lock group provides a collision detection mechanism. In particular, lock groups specify one or more fields to be modified by only one client during a transaction by that client. Lock groups are thus useful for managing data in a database. For example, if a customer object includes fields for a customer name and address, a lock group may specify the name and address fields so that, for example, one client does not change the data in the name field while another client changes data in the corresponding address field. In other words, the data in the name and address fields can only be changed by one client during a transaction to avoid, for example, an incorrect address being entered for a particular name.

Lock groups are used to determine conflicts when a client commits the transaction. When a client performs a transaction modifying data in a particular object and attempts to commit the transaction to save the modifications, the system determines if any lock groups include any of the modified fields, and if so, it further determines if any other application modified any field of those lock groups. The system does not commit the transaction and modify the database if another client made such modifications.

A conventional lock group includes all fields in an object. However, objects may include many fields and a client will often only modify a small set of fields in an object. Many conflicts occur when a lock group contains a large number of fields because only one client may modify data in an entire object during a transaction, which effectively prevents other clients from modifying any data in the object during the transaction.

Conventional object-oriented systems using optimistic concurrency control to access a database do not allow the client to modify some fields of an object without stopping other transactions from simultaneously modifying other fields in the same object. In conventional systems, if one transaction modifies a field of an object, no other transaction may modify another field in the same object. Consequently, conventional systems do not allow a field to simultaneously belong to more than one lock group. Additionally, conventional lock groups do not contain fields of different classes. These limitations slow the system by stopping different applications from simultaneously accessing different fields of the same object. It is therefore desirable to improve such systems.

SUMMARY

Methods and systems consistent with the present invention satisfy this and other desires by providing a method for allowing lock groups to contain fields in different classes and allowing a field to be in more than one lock group.

In accordance with methods consistent with the present invention, a method is provided in a data processing system having lock groups and classes with fields. This method receives an indication of a lock group specifying that the lock group contains a first field from a first class and a second field from a second class and creates the specified lock group. It further receives a request to commit a transaction affecting a value for one of the fields in the lock group, and determines whether to commit the transaction based on whether at least one of the fields in the lock group was modified during the transaction.

Methods and systems consistent with the present invention allow the concurrent access of a single object when the individual fields of the object are accessed by separate clients. This, in turn, reduces the delay of waiting for an object to be free for access and decreases the delay of rolling back transactions that are concurrently accessing an object. The reduction of these delays increases the overall data processing efficiency for the system.

The above features, other features and advantages of the present invention will be readily appreciated by one of ordinary skill in the art from the following detailed description of the preferred implementations when taken in connection with the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Introduction

Figure 1:
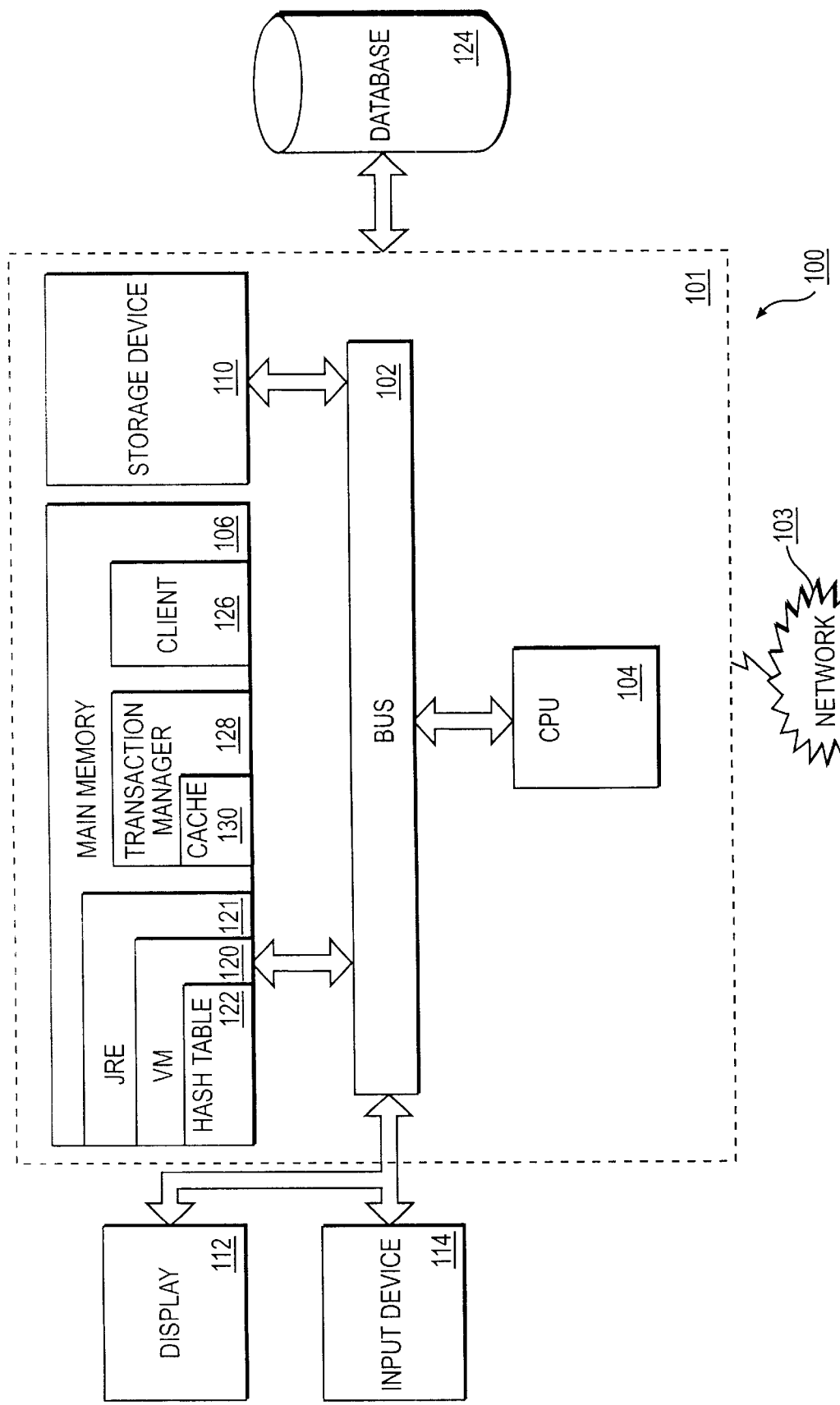
FIG. 1 is a diagram of a computer system in accordance with methods and systems consistent with the present invention.

Methods and systems consistent with the present invention use optimistic concurrency control and allow multiple clients to simultaneously modify the same object provided that they modify fields in different lock groups. They further allow an optimistic concurrency control lock group to contain fields of different classes. Additionally, they allow a single field to be in more than one lock group. These systems allow "fine-grained" consistency for concurrent access to a database. Fine-grained consistency refers to the fact that individual fields of an object may be locked locking the entire object, thereby allowing other transactions to concurrently access other fields of the object. Methods and systems consistent with the present invention allow increased concurrent access to objects. They reduce the delay of waiting for all fields of an object to be free for access and, in turn, reduce transaction roll backs.

Generally, lock groups are used to specify related data items within an object. While a user modifies data within an object, the user may not affect the entire object. If the data is also part of a lock group, the transaction only impacts the set of fields indicated by the lock group. Other processes are free to access and update data within the same object, as long as that data is outside of the lock group. For example, it might be possible for some other process to change fields in the object without conflicting with the transaction's changes.

When ready to commit data changes, the system checks the original, unmodified copy of the data against the current data (at commit time) in the database. If the data is the same, the transaction commits its changes to the database. However, if it detects a difference, then the system scans the lock groups for this object and checks for a collision. That is, it checks to determine whether it is about to commit a change to a field that is specified within a lock group, and during the time since it read the data and prepared to commit its changes, some other client has modified either the same field or another field also specified within the lock group. If so, this is a collision condition and the process does not commit its changes. Note that there can be multiple lock groups for an object, and these lock groups may overlap.

In one embodiment, a client using a system consistent with the present invention establishes the lock group as a group of fields that are interdependent. A lock group can correspond to a single field or any combination of fields in any number of classes. The user can specify those fields that together should be treated as a lock group, and often those fields whose values depend on each other are grouped together. When an application modifies a field, its transaction may be adversely affected if another application modifies or updates any field that belongs to any lock group that contains the specified field.

In one implementation of the present invention, the system operates in an object-relational mapping tool that maps relational database information into objects and vice versa where the techniques described below are performed when transactions are committed. Such a mapping tool is further described in co-pending U.S. application Ser. No. 09/106,212, entitled "User Interface for the Specification of Lock Groups," which has previously been incorporated by reference.

Such a mapping tool generates source code from a schema in a relational database containing tables. The generated source code contains classes that contain fields, and these classes and fields are generated from the tables and columns of the relational database. The mapping tool maps a table to a class and maps each column of the table to a field in the class. Users can use the mapping tool to define lock groups on the fields of the classes, however, these lock groups are actually effectuated by lock groups on the corresponding columns in the tables corresponding to the objects. For purposes of clarity, the lock groups will be described below as being defined on the columns of tables in the database. However, one skilled in the art will appreciate that the lock groups can also be viewed as being implemented on fields of a class or other elements in a data structure.

System Details

FIG. 1 is a block diagram of a data processing system 100 suitable for use with methods and systems consistent with the present invention. The data processing system 100 comprises a computer system 101 connected to the Internet 103. Computer system 101 includes a central processing unit (CPU) 104, a main memory 106, and a secondary storage device 110 interconnected via bus 102. Additionally, the computer system 100 includes a display 112, and an input device 114. The main memory 106 contains a virtual machine (VM) 120 such as the Java™ Virtual Machine (JVM), a hash table 122, a client 126, and a transaction manager 128. The transaction manager 128 also contains a cache 130 used to temporarily store updated data before committing it to the database. As described below, the hash table 122 may be implemented as any form of temporary storage and is used to temporarily store columns of tables belonging to lock groups. The Java™ Virtual Machine is a well-known execution vehicle for computer programs and is described in greater detail in Lindholm and Yellin, *The Java Virtual Machine Specification*, Addison-Wesley, 1996, which is incorporated herein by reference. The VM 120 is contained a Java Runtime Environment (JRE) 121. The client 126 utilizes the database 124 by using the transaction manager 128. The transaction manager 128 performs transactions on the database 124 using fine-grained concurrency control as will be further described below. The database 124 stores data against which transactions may be performed. This database 124 may reside on a server computer (not shown) or, in another implementation consistent with the present invention, may also reside on the computer 101.

One skilled in the art will appreciate that the hash table 122 and other aspects of methods and systems consistent with the present invention may be stored on or read from any other computer readable media besides memory like secondary storage devices, such as hard disks, floppy disks, and CD ROM, or a carrier wave from a network 103, such as the Internet. Although the hash table 122 is described as operating in a VM 120, one skilled in the art will appreciate that the hash table 122 may operate in other programs, like operating systems, and may operate in other object-oriented or non-object oriented programming environments.

Additionally, one skilled in the art will also appreciate that data processing system 100 may contain additional or different components.

Method

Figure 2:
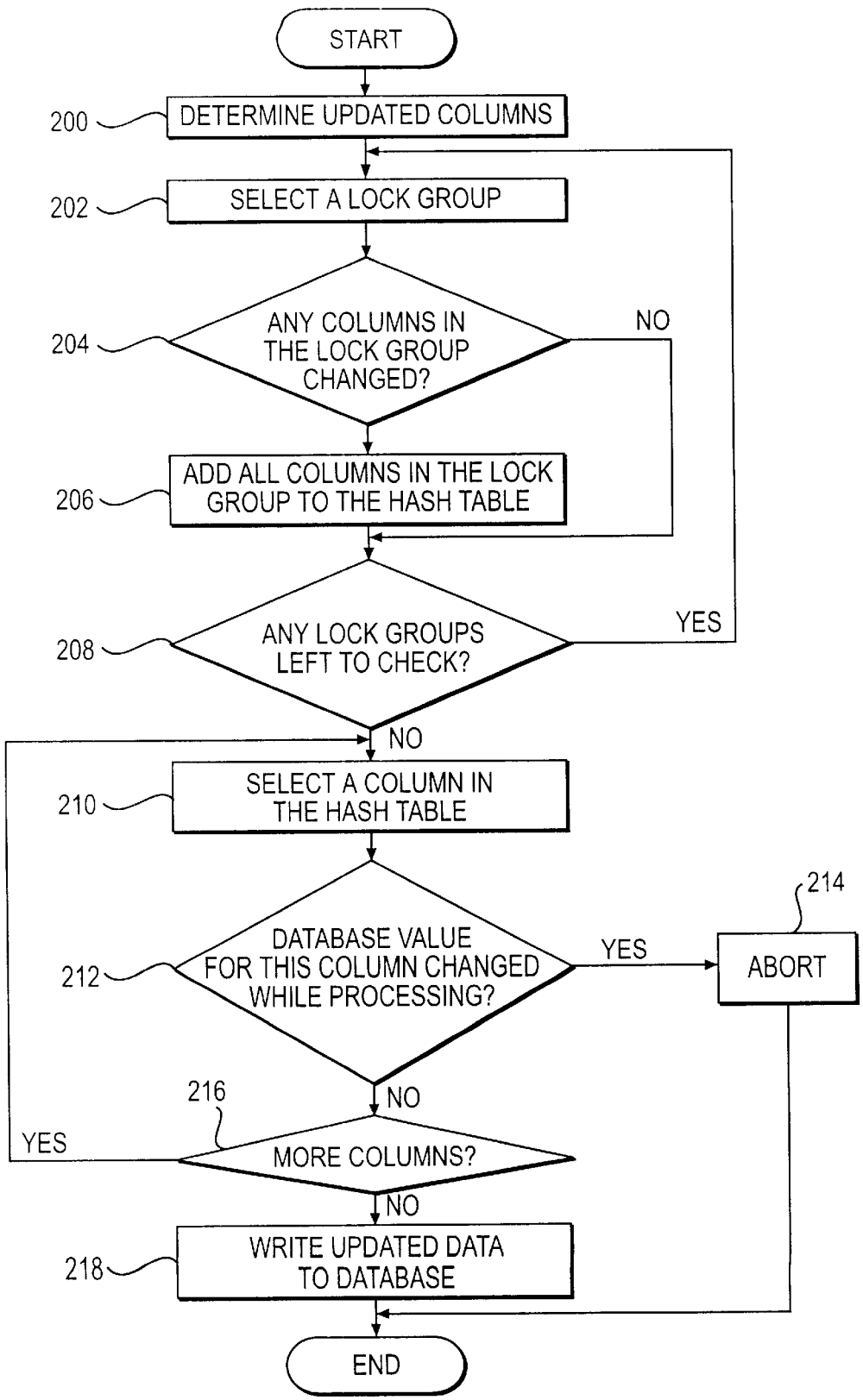
FIG. 2 is a flowchart of a method for committing a transaction in accordance with methods and systems consistent with the present invention.

FIG. 2 depicts a flowchart of the steps performed by the transaction manager 128 when implementing lock group transactions consistent with the present invention. The transaction manager 128 receives a transaction request from a client 126. During a transaction, the transaction manager 128 stores local copies of the columns in memory (i.e., a cache) and performs operations on these copies of the columns, using the well-known technique of caching. Only at commit time does the transaction manager 128 update the copy of the columns in the database 124. Generally, when it is time for the transaction to commit, if a column of a lock group is to be updated, the transaction manager 128 checks whether all columns in that lock group remained unchanged in the database 124 during the transaction. If so, the transaction manager 128 commits the transaction. Otherwise, the transaction manager 128 rolls back the transaction.

When it is time to commit the changes to the database 124, the first step performed by the transaction manager 128 is to determine which columns were updated in the cache 130 by the transaction (operation 200). To accomplish this, the transaction manager 128 at the beginning of the transaction cached the initial value of the columns on which the transaction is to operate and now compares these values with the current values of the columns in the cache 130; columns that do not have the same value have been updated in the cache 130.

Next, the transaction manager 128 selects a lock group (operation 202) and determines if any of the columns of the lock group were updated in the cache 130 during the transaction (operation 204). If any of the columns of the lock group were changed, all of the columns of that lock group are added to the hash table 122 (operation 206), and if there are more lock groups to process (operation 208), processing continues to operation 202.

Otherwise, the hash table 122 has been populated with columns from the lock groups that have changed, and the transaction manager 128 selects a column from the hash table (operation 210). The transaction manager 128 then determines whether the database value for this column has changed in the database 124 during the processing of the transaction (operation 212). To make this determination, the transaction manager 128 compares what the database value for the column was at the beginning of the transaction with the database value for the column at the end of the transaction (commit time). If the database value for the column has changed in the database 124 during the transaction, the transaction manager 128 rolls back the transaction by aborting it (operation 214). If, however, the value has not changed, another column is selected (operation 216). If none of the columns in the hash table 122 had database values that changed in the database 124 during the transaction, the transaction manager 128 commits the transaction, and then updates the columns in the database based on the value of the columns in the cache 130 (operation 218).

EXAMPLE

For example, a customer table might consist of the columns lastname, firstname, street, city, zip_code, area_code, phone_number, and sales_representative. It might not make sense to define a lock group that contains both lastname and sales_representative because, in most environments, changes to the values of these two columns would be independent of each other. (However, if a customer were assigned a sales representative based simply on last name, then these columns would be dependent on each other.)

However, because the address components—street, city, zip_code, area_code, and phone_number—are interrelated, they might be placed together in one lock group. Having this information in the same lock group ensures that if two clients were simultaneously updating address information for the same customer, one client would not be updating the phone_number while the other client was updating the customer's area_code. However, two processes can simultaneously update the same customer table provided that the data they access is not in the same lock group, thus improving concurrent access. Since the same column can be in multiple lock groups, in the above example, the area_code might be in both the Phone and Address lock groups.

Figure 3:
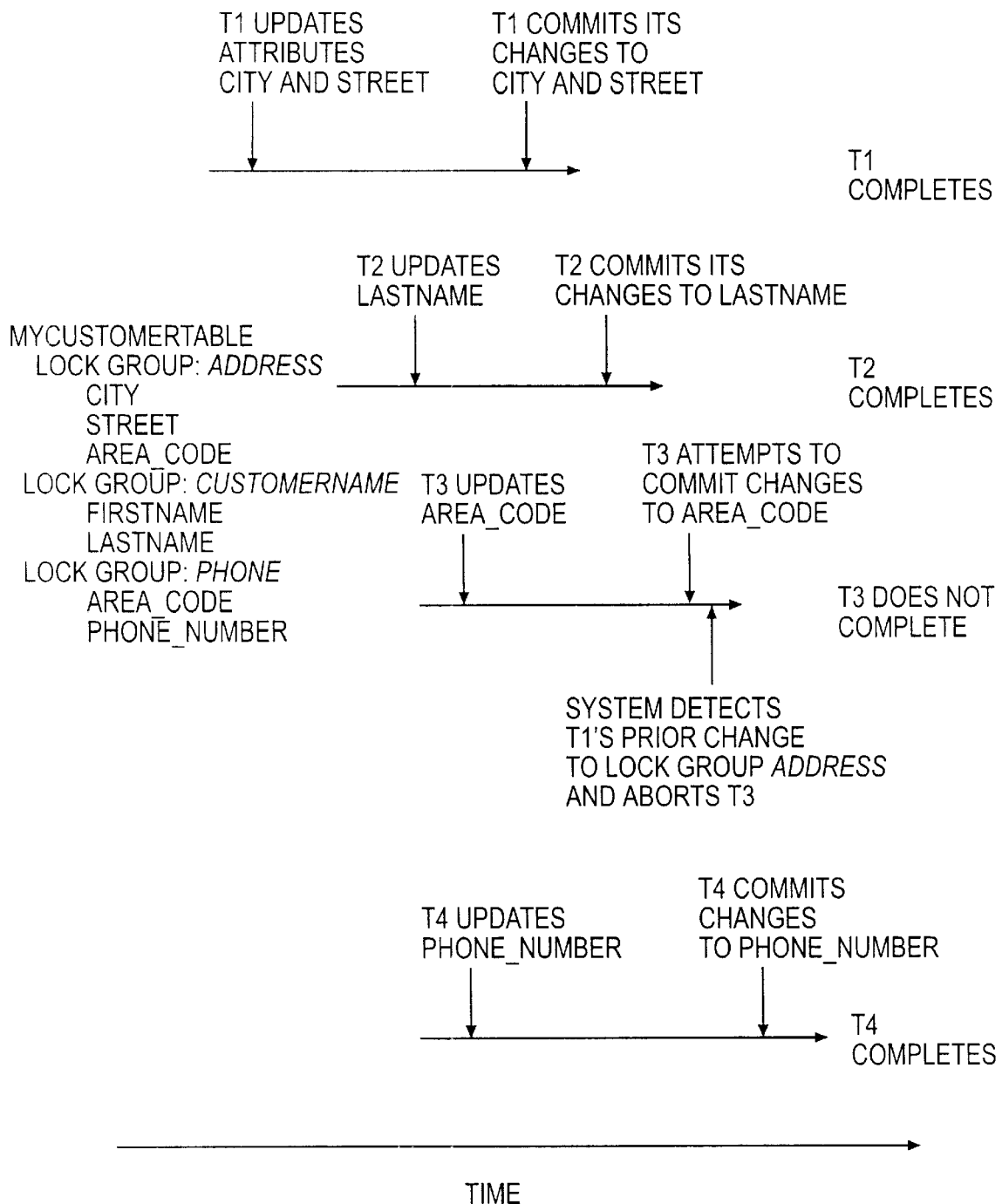
FIG. 3 is a diagram of an example of concurrent transactions in accordance with methods and systems consistent with the present invention.

FIG. 3 illustrates multiple transactions accessing the same table using lock groups in an optimistic concurrency control situation in accordance with methods and systems consistent with the present invention. In this example, MyCustomerTable has six data members divided into three lock groups (Phone, Address, and CustomerName). Four transactions (T1–T4) simultaneously access different attributes within the same MyCustomerTable instance. Transaction T1 modifies two attributes—city and street, while transaction T2 modifies lastname. They both complete because T1 commits before any changes are committed by any of the other transactions, and none of the columns modified by T1 belong to any lock group containing the columns modified by T2.

However, the system does not let transaction T3 complete its modification to area_code because other attributes in lock group Address changed after T3 read area_code, but before it completed its modifications. These changes were committed to the database 124 by T1.

Note, though, that the system allows T4 to commit because there are no conflicting changes. If T4 had attempted to change area_code, there would have been a conflict because area_code belongs to the lock groups Address and Phone, and T1 already changed other attributes that belong to Address.

Transaction T3 and transaction T4 potentially had a conflict because of modifications to attributes in lock group Phone, which has the attributes area_code and phone_number. T4 can commit its changes to phone_number because the database values for the attributes in lock group Phone remain unchanged from when T4 read them—due to T3's failed attempt to modify area_code. However, had T3 succeeded, then T4 would have failed.

Conclusion

Methods and systems consistent with the present invention allow a lock group to contain individual columns of different tables. They also allow a column in a table to belong to more than one lock group. This permits transactions to concurrently access a single table in the database if the individual columns of the lock groups do not overlap. The concurrent access of a single table in the database increases the overall data processing efficiency by reducing the delay of transaction roll backs and the delay of waiting for an table to be released from a lock group.

The foregoing description of an implementation of the invention has been presented for purposes of illustration and description. It is not exhaustive and does not limit the invention to the precise form disclosed. Modifications and variations are possible in light of the above teaching or may be acquired from practicing of the invention. The scope of the invention is defined by the claims and their equivalents.

What is claimed is:

1. A method in a data processing system having a database and classes with fields, the method comprising:

receiving an indication of a lock group specifying a first field from a first class and a second field from a second class such that the first class has at least one other field that is not contained by the lock group;

receiving a request to commit a transaction to the database affecting a value for one of the fields in the lock group; and determining whether to commit the transaction to the database based on whether at least one of the fields in the lock group was modified by another transaction during performance of the transaction.

2. The method of claim 1, wherein the determining further includes:

aborting the transaction when at least one of the fields of the lock group was modified during the transaction.

3. The method of claim 1, wherein the determining further includes:

committing the transaction when the fields of the lock group were unchanged during the transaction.

4. The method of claim 1, wherein the class is a table and the fields are columns, and wherein the receiving further includes:

receiving an indication of a lock group specifying that the lock group contains a first column from a first table and a second column from a second table.

5. A method in a data processing system having a database and a class with fields, the method comprising:

receiving an indication of two lock groups specifying that the two lock groups each share a first of the fields such that the class has at least one other field that is not in at least one of the lock groups;

receiving a request to commit a transaction to the database affecting a value of a second off the fields in one of the lock groups; and determining whether to commit the transaction based on whether at least one of the fields in the one lock group was modified during the transaction.

6. The method of claim 5, wherein the determining further includes:

aborting the transaction when at least one of the fields of the one lock group was modified during the transaction.

7. The method of claim 5, wherein the determining further includes:

committing the transaction when the fields of the one lock group were unchanged during the transaction.

8. A method in a data processing system having a database with database classes and a hash table, the method comprising:

specifying a lock group with fields from different database classes such that at least one of the classes has at least one field not contained in the lock group;

initiating a transaction by a client such that at least one of the fields in the lock group is updated;

receiving a request to commit the transaction, further including the steps of:

determining which of the fields were updated by the transaction;

determining which of the lock groups contain the updated fields;

adding the updated fields of the determined lock groups to the hash table;

determining whether the added fields were updated in the database by another client during the transaction;

aborting the transaction when it is determined that at least one of the added fields was updated in the database by another client during the transaction; and committing the transaction when it is determined that the added fields remained unchanged in the database during the transaction.

9. A computer-readable memory device comprising:

a first class with a first field defined to be a member of a lock group, the first class having at least one other field not contained in the lock group; and a second class with a second field defined to be a member of the lock group such that a determination of whether to commit a transaction requested by a client is based on whether the first field or the second field were updated by another client during the transaction.

10. A data processing system having a database with database classes and a hash table, the data processing system comprising:

means for specifying a lock group with fields from different database classes such that at least one of the classes having at least one field not contained in the lock group;

means for initiating a transaction by a client such that at least one of the fields in the lock group is updated;

means for receiving a request to commit the transaction, further including:

means for determining which of the fields were updated by the transaction;

means for determining which of the lock groups contain the updated fields;

means for adding the updated fields of the determined lock groups to the hash table;

means for determining whether the added fields were updated in the database by another client during the transaction;

means for aborting the transaction when it is determined that at least one of the added fields was updated in the database by another client during the transaction; and means for committing the transaction when it is determined that the added fields remained unchanged in the database during the transaction.

11. A computer-readable medium containing instructions for controlling a data processing system to perform a method, the data processing system having a database and classes with fields, the method comprising:

receiving an indication of a lock group specifying a first field from a first class and a second field from a second class such that the first class has at least one other field that is not contained by the lock group;

receiving a request to commit a transaction to the database affecting a value for one of the fields in the lock group; and determining whether to commit the transaction to the database based on whether at least one of the fields in the lock group was modified during the performance of transaction.

12. The computer-readable medium of claim 11, wherein the determining step of the method further includes:

aborting the transaction when at least one of the fields of the lock group was modified during the transaction.

13. The computer-readable medium of claim 11, wherein the determining step of the method further includes:

committing the transaction when the fields of the lock group were unchanged during the transaction.

14. A computer-readable medium containing instructions for controlling a data processing system to perform a method, the data processing system having a database and a class with fields, the method comprising:

receiving an indication of two lock groups specifying that the two lock groups each share a first of the fields such that the class has at least one other field that is not in at least one of the lock groups;

receiving a request to commit a transaction to the database affecting a value of a second of the fields in one of the lock groups; and determining whether to commit the transaction based on whether at least one of the fields in the one lock group was modified during the transaction.

15. The computer-readable medium of claim 13, wherein the determining step of the method further includes:

aborting the transaction when at least one of the fields of the one lock group was modified during the transaction.

16. The method of claim 14, wherein the determining step further includes:

committing the transaction when the fields of the one lock group were unchanged during the transaction.

17. A data processing system comprising:

a secondary storage device with a database containing classes with fields;

a memory further including:

a transaction manager configured to receive a definition of a lock group containing a field in a first class and a field in a second class such that the first class has at least one other field that is not contained by the lock group, configured to receive from a client a request to commit a transaction wherein a first one of the fields of the lock group is modified, and configured to abort the transaction when a second one of the fields of the lock group is changed in the database by another client during the transaction; and a processor for running the transaction manager.

18. A data processing system comprising:

a secondary storage device with a database containing classes with fields;

a memory further including:

a transaction manager configured to receive a definition of two lock groups sharing a first one of the fields of a class such that the class has at least one other field that is not in at least one of the lock groups, configured to receive from a client a request to commit a transaction wherein a second one of the fields of one of the two lock groups is modified, and configured to abort the transaction when a third one of the fields of the one lock group containing the second one of the fields is changed in the database by another client during the transaction; and a processor configured to run the transaction manager.

* * * * *

UNITED STATES PATENT AND TRADEMARK OFFICE
CERTIFICATE OF CORRECTION

PATENT NO. : 6,240,413 B1
DATED : May 29, 2001
INVENTOR(S) : Timothy R. Learmont It is certified that error appears in the above-identified patent and that said Letters Patent is hereby corrected as shown below:

<u>Column 8,</u>
Line 42, "off" should read -- of --.

Signed and Sealed this

Fourteenth Day of May, 2002

Attest:

JAMES E. ROGAN
*Attesting Officer*     *Director of the United States Patent and Trademark Office*